United States Patent [19]

Kluczynski et al.

[11] 4,190,216

[45] Feb. 26, 1980

[54] NARROW GAUGE FILM CASSETTE

[75] Inventors: Achim Kluczynski, Immekeppel; Johannes Tabel, Leverkusen, both of Fed. Rep. of Germany

[73] Assignee: AGFA-Gevaert, A.G., Fed. Rep. of Germany

[21] Appl. No.: 799,276

[22] Filed: May 23, 1977

[30] Foreign Application Priority Data

May 28, 1976 [DE] Fed. Rep. of Germany ....... 2623942

[51] Int. Cl.² ................................................. G03B 1/04
[52] U.S. Cl. ..................................... 242/194; 352/156
[58] Field of Search .................... 242/193, 194, 71.1, 242/71.2; 352/156, 72, 78 R

[56] References Cited

U.S. PATENT DOCUMENTS

| | | | |
|---|---|---|---|
| 3,208,685 | 9/1965 | Edwards et al. | 242/71.2 |
| 3,208,686 | 9/1965 | Edwards et al. | 242/194 |
| 3,415,599 | 12/1968 | Winkler et al. | 352/78 R |
| 3,623,679 | 11/1971 | Neudecker et al. | 242/194 |

FOREIGN PATENT DOCUMENTS 1255484  11/1967  Fed. Rep. of Germany ........... 242/194

*Primary Examiner*—Leonard D. Christian
*Attorney, Agent, or Firm*—Connolly & Hutz

[57] ABSTRACT

The external cassette casing of a narrow-gauge film cassette with film spools arranged coaxially to each other is closed on five sides and only open on the side opposite the film window. The base of the cassette casing is provided with a hole opposite the dog-cassette opening. A screw plug is placed through this hole, this plug engaging in a corresponding thread in the hollow bearing pin of the film take-up core with its thread shank and projecting slightly beyond the open worked end of the bearing journal with the lengthened part of the shank.

9 Claims, 4 Drawing Figures

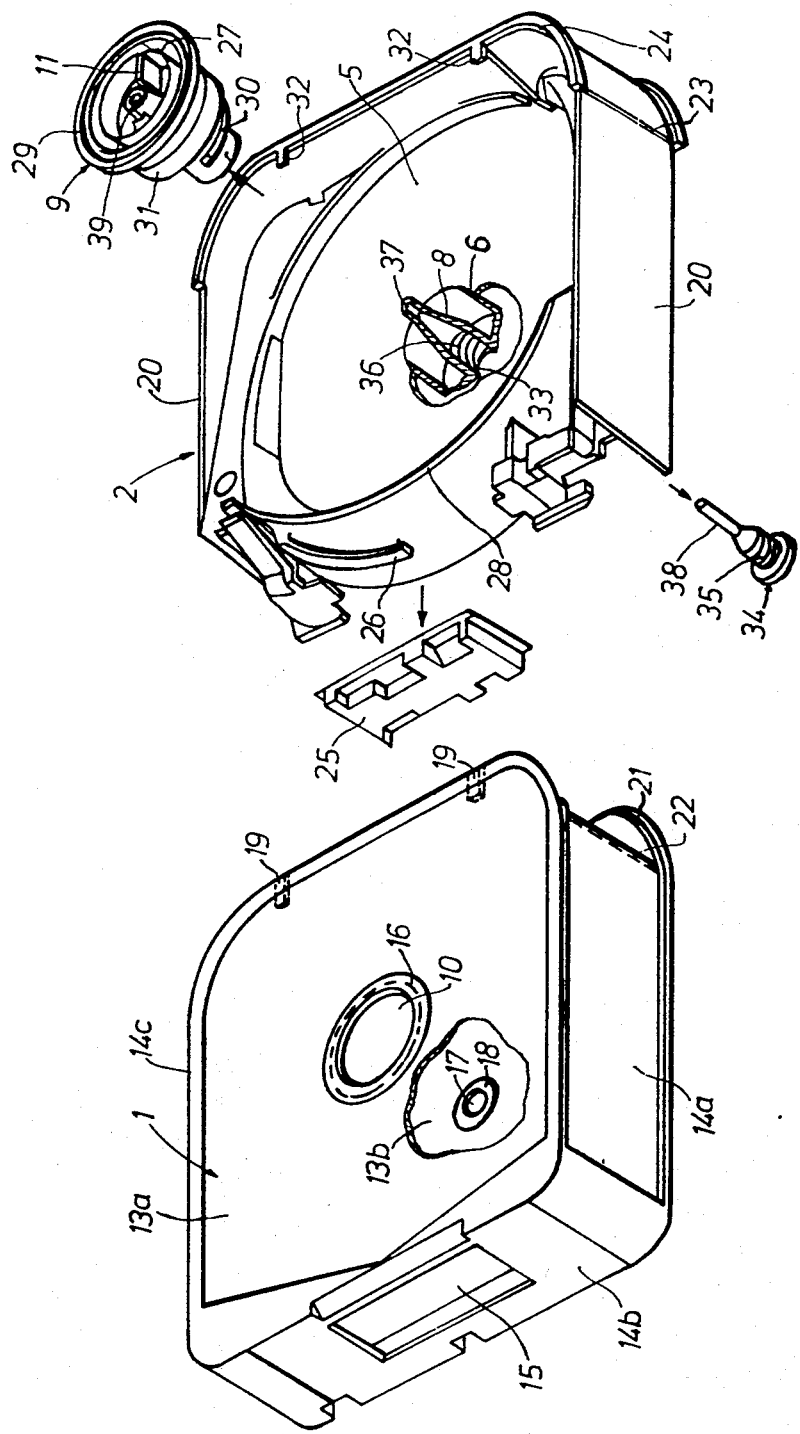

NARROW GAUGE FILM CASSETTE

The invention relates to a cassette for a cinematographic film, in which the unexposed and the exposed film spools are arranged coaxially of each other. A cassette of this type consists of a rectangular or square inner cassette element with a false bottom, having a fixed core for the feed spool fitted on one side and a storage pin for the take-up core on the other side, and a suitable cassette casing which forms a light-tight seal with the inner cassette element for the film spool and which has a film window in one side face and a cassette opening in a base which is perpendicular to this lateral face.

Cassettes of this type are inserted in cine cameras and are sold under the name Super-8 cassettes. They are described in U.S. Pat. Nos. 3,208,685 and 3,208,686 for example. Commercially, these cassettes are sold filled with the film. After exposure they are sent by the user to a processing factory for development. The welded cassettes are forced open there and the film removed for photographic processing. The empty cassettes are then thrown away. This results in a considerable wastage of material.

A re-usable Super-8 cassette has been proposed in German Gebrauchsmuster No. 7,120,864. The cassette described in this Gebrauchsmuster is manufactured so that the exposed film can be removed through the film window of the cassette, without the cassette having to be destroyed. The cassette can then be re-loaded by opening the removable cassette casing. However, since the cassette casing is normally welded to the inner cassette element, damage occurs in this operation.

An object of the present invention is to produce a re-loadable film cassette from which the entire exposed film can be removed for photographic development. Compatibility with all commercial Super-8 cine cameras must be maintained A further requirement is that the operations required to open and close the cassette must not damage the apparatus. This means, in particular, that in the insertion of a new reel of film in the empty cassette, the normal steps in this operation must be maintained. This means that nothing may be changed in the cassette in the film path and on the side of the film supply chamber. Additional means for closing the cassette should be reduced to a minimum for economic reasons and should be suitable for mechanical operation. The cassette must be reliable for several opening and closing operations.

This invention therefore provides a cassette for a cinematograph film in which the unexposed and exposed film spool are arranged coaxially to each other, consisting of a rectangular or square inner cassette element with a false bottom, on one side of which a fixed core for the film speed spool is placed and on the other side of which a hollow bearing pin for the take-up core is placed, and a cassette casing suitable for the inner cassette element, which forms a light-tight enclosure with the inner cassette element for the film spool and has a film window in a side face and a cassette opening in a major face perpendicular to this side face, which cassette casing is closed on five sides and is only open on the face opposite to the film window, and whose major face opposite the cassette opening is provided with a hole through which a fastener is inserted, the fastener engaging with a corresponding fastening means on the inside of the bearing pin and projecting beyond the open end of the bearing pin.

In contrast to this, known cassettes have the cassette casing open on three lateral faces. When the cassette casing is slipped onto the inner cassette element, both the major faces can easily be fixed, thus simplifying assembly. This is no longer possible with the cassette according to the invention, since both the major faces are firmly bound together by the additional side faces. This causes problems in light-proofing of the take-up chamber. During insertion of the inner cassette element into the cassette casing, the film take-up core first rests on the bearing pin, so that a a small gap remains between the highest point of the film take-up core and the base of the cassette casing above it. Otherwise the inner element could not be inserted into the casing. In order to ensure light proofing between the upper edge of the film take-up core and the cassette opening in the loaded condition, the film take-up core is raised by the amount of the gap between the two components during insertion of the screw plug, so that the labyrinthine upper end of the take-up core engages in the labyrinth at the end of the cassette opening. In this way light is prevented from penetrating the cassette opening and reaching the take-up chamber. It follows from this lifting of the take-up spool that the drive units on the camera are certain to engage in the dog of the take-up spool thus providing compatibility with normal commercial camera systems.

A preferred way of firmly fixing the cassette casing and the inner cassette element is by means of a plastic screw, which for example has only 0.5 to 2 turns with a relatively high pitch. Such screws can easily be produced by injection moulding. A screw plug of this kind can also be modified in the manner of a bayonet fitting. For this purpose, the shank of the screw is provided with cams which engage a corresponding latching device in the bearing pin.

In an alternative embodiment, the screw plug is made of metal and is provided with a self-tapping thread. In this case, the thread is cut inside the bearing pin when the screw plug is first inserted.

When opening the cassette, the reverse order of operations is followed: that is, the screw is released and then removed. The cassette casing can then be removed. In order to simplify the removal of the screw plug, the hub of the take-up core is provided with an opening. The screw can then be pressed out through the opening by means of a pin or similar tool.

In a particularly preferred embodiment of the invention, a conically chamfered ring is applied concentrically to the bearing pin on the inner element of the cassette, on the side of the film feed spool, this ring engaging in the hole in the base of the cassette casing when the cassette casing and the inner element of the cassette are slid together. An initial locking of the cassette casing and the inner element is thus achieved even before insertion of the screw plug.

The advantages provided by the preferred embodiment of the cassette according to the invention consist in the fact that all parts of the cassette except the spool core can be re-used after cleaning and inspection. In practice, the screw plug in bayonet form in particular, provides an easily managed and safe connection between the cassette casing and the inner cassette element. This connection can always be released without damaging the essential parts of the cassette. However, the closed cassette is adequately protected against unauthorised opening, since a label is normally stuck over the screw head on the exterior of the base, so that the screw plug is not visible.

Another advantage consists in the fact that the components which are required in addition to those of the standard Super-8 cassettes can easily be produced by the injection moulding technique, so that the cassette is not made significantly more expensive. Finally, there is another important feature, which is, that no major modification is required in the automatic packing machines which are already available, in order to pack the new Super-8 cassette. The additional machine parts which are required for inserting and driving home the screw plug can be provided without high expenditure and can be mounted on the machines which are already available without any great difficulty.

A preferred embodiment of the invention is described in detail below with reference to the accompanying drawings. For comparison purposes, a traditional Super-8 cassette is shown in section in FIG. 1.

In the accompanying drawings:

FIG. 2 is a view shows the cassette casing according to the invention in perspective, and FIG. 3 the inner cassette element according to the invention with detached film pressure plate, screw plug and and film take-up core, also in perspective and FIG. 4 is an exploded pictorial view of a bayonet fitting.

Figure 1:
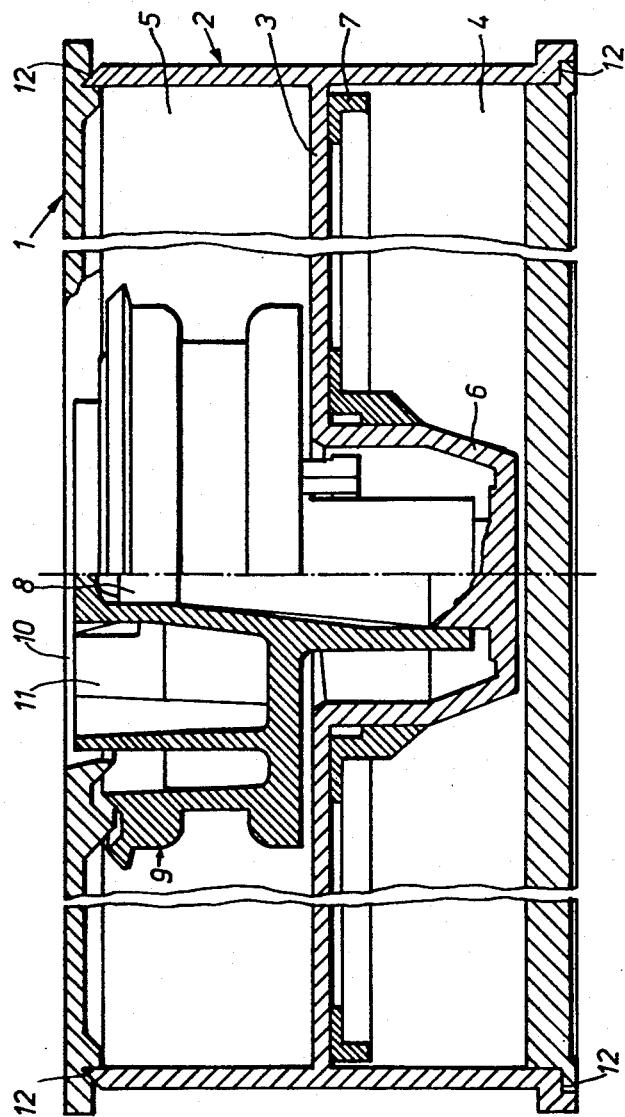
FIG. 1 is a view which shows a section through a traditional Super-8 cassette.

The known Super-8 cassette according to FIG. 1, comprises a cassette casing 1 which is open on three faces and which is slid over an inner cassette element 2. Two mutually overlapping chambers, namely a film feed chamber 4 and a film take-up chamber 5 are separated by a false bottom 3 on the inner cassette element 2. A fixed core 6 for a film feed spool is situated in the feed chamber 4. In order to diminish friction while unwinding the film, the film spool in the feed chamber 4 is placed on a plastics disc 7. A bearing pin 8 which projects into the take-up chamber 5 is formed on the core 6. This pin forms the bearing for a spool core 9 in the take-up chamber 5.

When the cassette is inserted in a cine-camera, a driving mechanism on the camera side engages in a dog 11 through a cassette opening 10. The spool core 9 can be set in rotation by means of this. The film is thus drawn from the feed spool into the chamber 4, exposed in a film window and correspondingly wound onto spool core 9. The cassette casing 1 is permanently welded or stuck to the inner element 2 at a connecting point 12. For this reason, reuse is not possible: after removal of the exposed film for photographic development the cassettes are thrown away or at the most crushed to reclaim the raw materials. In contrast to this, the cassette according to the invention is re-usable: the cassette sent by the customer is opened in the processing laboratory, the exposed film removed and the empty cassette sent back to the film manufacturer. After examination for any faults the cassette is packed with a new film there, newly labelled and supplied to the customer. It is clear that considerable saving in materials is achieved by this recycling.

The cassette casing of the film cassette according to the invention, shown in FIG. 2, readily illustrates several alterations in the earlier disposable cassettes. In contrast to the earlier model, it is closed on five faces, that is, the cassette casing 1 comprises both the major faces 13a, 13b and the three side faces 14a, 14b and 14c. The fourth face (right of illustration) is open. The inner cassette element 2 can be inserted through this opening, like a drawer. A film window 15 is provided in the opposite side face 14b. The cassette opening 10 with a light labyrinth 16 is provided in the upper major face 13a. A hole 17 for a screw plug (see FIG. 3) is opposite in the lower major face 13b. The hole 17 is provided with a frusto conical extension 18 towards the interior. Recesses 19 are provided on the lateral edges opposite the film window which engage with corresponding locating lugs 32 on the inner cassette element when the cassette casing 1 and the inner cassette element 2 are slid together. Thus the ends of the bases are protected against lifting in the closed position.

The side walls 20 of the inner element slide between the lateral faces 14a and 14c when the inner cassette element 2 is inserted into the cassette casing 1. Thus exact control of the position of the inner element is obtained. The edges on these lateral surfaces are provided with light labyrinths 21, 22, which engage in corresponding labyrinths 23, 24 on the inner cassette element 2 during sliding together (see FIG. 3).

FIG. 3 shows the inner cassette element in an exploded perspective view. A film pressure plate 25 is fixed on its front face by means of an injection moulded spring clip 26. It ensures that the film is perfectly flat in the region of the film window 15.

The bearing pin 8 and the take-up core 9 which rotates round this pin are the most important components in the takeup chamber 5. In contrast to the known Super-8 cassettes the size of the spool core 9 is determined in such a way in this cassette that the highest point of the spool core 9, that is the ring face 27, lies directly under the face defined by a ring 28 on the inner cassette element, when the spool core 9 is placed on the bearing pin 8. Otherwise the spool core 9 would push against the upper major face 13a during insertion of the inner cassette element into the cassette casing. The spool core 9 is provided with a labyrinth 29 on the side face, this labyrinth corresponding to the labyrinth 16 on the cassette opening 10 in the cassette casing. The dog 11 serves to drive the spool core. A catch 30 injection moulded on the spool core 9 prevents the film spool from unwinding in the reverse direction.

The spool core 9 firstly lies with its lower edge 31 on the partition 3 in the cassette element. In this position, as described above, the inner cassette element is inserted into the cassette casing until the recesses 19 of the cassette casing lock in the projections 32 on the inner cassette element. Additional pre-locking of the cassette casing and the inner cassette element is thus obtained, if a conically chamfered ring 33 is moulded onto the fixed core 6 for the film feed spool concentric, to the bearing pin 8, which ring engages in the corresponding frusto-conical extension 18 of the hole 17. The cassette must now be closed again. This is done with the screw plug 34. In order to close the cassette, the screw 34 is placed through the hole 17 and driven home with few rotations. Thus the threaded shank 35 taps a corresponding thread 36 in the inside of the pin 8 which is formed as a hollow cylinder. In contrast to the traditional cassettes, the bearing pin 8 is penetrated to its spherical cap 37. The tapered part 38 of the screw shank is inserted through the hole 37 in the bearing pin 8 when the screw 34 is inserted and screwed home. In this way the film take-up core 9 is raised so that the labyrinth 29 engages in the labyrinth 16 of the cassette casing. The distance by which the core is raised lies in the range of 0.5 to 2 mm, depending on the type of cassette. In this way light-proofing of the take-up chamber 5 is ensured. In addition, the dog 11 is assured of taking in the same height as in the former disposable cassettes.

According to a further embodiment, the screw plug 34 is made of a thermoplastic material, for example from the same material as the cassette itself (black polystyrene) and is produced by injection moulding. In this case, the thread 36 in the pin 8 must also always be moulded. A few turns are sufficient to produce a safe connection between the cassette casing and the inner cassette element. A plug element which is similar to a screw may alternatively be provided, which is shown in FIG. 4 in the form principle of a bayonet fitting 40. For this purpose notching cams 42 are formed on the shank of the screw plug 34, and corresponding latching devices 44 are formed on the inner face of the pin 8. When the screw plug 34 is rotated (0.5 to 2 rotations) the cam of the screw engage in the catching elements within the bearing pin 8 and form a releasable but sure plug. In order to protect the cassette against unauthorized opening, a label is suitably stuck on the screw head on the outside of the cassette casing.

When opening the cassette, the reverse order is followed. In order to simplify removal of the screw plug 34, the hub of the film up-take core 9 is also open at hole 39. After unlatching, the screw plug 34 can easily be pressed out downwards with a pin or similar tool, through the holes 39 and 37.

The take-up core 9 is thermally welded to the beginning of the film strip during packing. Then the film spool in the feed chamber 4 is wound round the core 6 and the take-up core 9 with the end of the film fixed on it is placed on the bearing pin 8. At the same time it must be ensured that the film is correctly threaded up in the film channel which leads from the feed chamber 4 past the film gate 15 to the take-up chamber 5. The cassette casing 1 is correspondingly pushed over the inner cassette element 2 containing the film and the screw plug 34 is inserted and locked by rotation. The cassette is labelled and packed after examination. Since these procedures involve almost no welding, in contrast to the earlier disposable cassettes, the cassette can always be re-packed with another film and supplied to the customer.

What we claim is:

1. A cassette containing a spool for carrying and feeding a film from one position to another within the cassette and having a plurality of parts being adapted to be repeatedly disassembled and reassembled to form a light-tight container comprising
   a first casing having an open end, a film aperture in a casing wall diametric to the open end, and a first and second major casing walls each normal to the apertured wall, said major walls spaced apart and diametric to each other and forming with the apertured wall a chamber accessible through said open end,
   the first major wall having a first opening centrally positioned for receiving a film spool and the second major wall having a second opening centrally positioned and diametric to said first opening,
   a frusto-conical surface around said second opening in said second major wall extending into said chamber,
   a second casing having wall members engageable with the walls of the first casing and means formed in the walls of the first and second casings to provide light-tight junctions between the first and second casings,
   a film feed spool having a fixed core and a take-up core positioned within the second casing, said take-up core being rotatably positioned with respect to the fixed core and provided with means for providing rotation,
   a fastening member positionable within the cassette comprised of
   a center post positionable on said frusto-conical surface, said center post having a central passage extending axially through the post; and
   a pin capable of being fastened in the central passage and adapted to both engage the outer surface of the second major wall of the first casing,
   said pin extending through the central passage and engaging the film spool,
   whereby the film spool is engaged into a light-tight relationship with the inner surface of the first major wall of the first casing.

2. A cassette as claimed in claim 1 in which the pin is a screw plug.

3. A cassette as claimed in claim 2 in which the screw plug is produced from a thermoplastic material by injection moulding.

4. A cassette as claimed in claim 3 in which the screw plug has from 0.5 to 2 turns.

5. A cassette as claimed in claim 3 in which the screw engages with a corresponding thread in the bearing pin.

6. A cassette as claimed in claim 2 in which the screw plug is made of metal and is provided with a self-tapping thread.

7. A cassette as claimed in claim 1 in which the pin is in the form of a bayonet fitting and a corresponding engaging device is provided in the center part.

8. A cassette as claimed in claim 1 in which the pin projects from 0.5 to 2 mm beyond the open end of the center post.

9. A cassette as claimed in claim 1 in which a frusto-conical chamfered ring carries the frusto-conical surface, said ring being concentrical to the center post.

* * * * *